(12) United States Patent
Hsieh et al.

(10) Patent No.: US 10,095,019 B2
(45) Date of Patent: Oct. 9, 2018

(54) IMAGE SCANNING SYSTEM FOR TISSUE SLIDES

(71) Applicant: METAL INDUSTRIES RESEARCH & DEVELOPMENT CENTRE, Kaohsiung (TW)

(72) Inventors: Yu-Sung Hsieh, Tainan (TW); Yi-San Chang, Tainan (TW); Yu-Jen Lu, Tainan (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 296 days.

(21) Appl. No.: 15/256,656

(22) Filed: Sep. 5, 2016

(65) Prior Publication Data

US 2017/0146785 A1 May 25, 2017

(30) Foreign Application Priority Data

Nov. 23, 2015 (TW) .............................. 104138842 A (51) Int. Cl.
| | |
|---|---|
| G03B 17/48 | (2006.01) |
| G02B 21/18 | (2006.01) |
| G02B 21/26 | (2006.01) |
| G02B 21/36 | (2006.01) |
| G02B 26/02 | (2006.01) |
| H04N 5/232 | (2006.01) |

(52) U.S. Cl.
CPC ........... *G02B 21/361* (2013.01); *G02B 21/18* (2013.01); *G02B 21/26* (2013.01); *G02B 21/367* (2013.01); *G02B 26/02* (2013.01); *G03B 17/48* (2013.01); *H04N 5/23238* (2013.01)

(58) Field of Classification Search
None
See application file for complete search history.

(56) References Cited

U.S. PATENT DOCUMENTS

| | | | | |
|---|---|---|---|---|
| 4,006,487 A | * | 2/1977 | Allen .................. | G02B 21/088 396/155 |
| 2006/0092505 A1 | * | 5/2006 | Abnet ................. | G02B 21/025 359/380 |

(Continued)

FOREIGN PATENT DOCUMENTS

| | | |
|---|---|---|
| CN | 1887219 | 1/2007 |
| CN | 101438147 | 5/2009 |

(Continued)

OTHER PUBLICATIONS

Taiwanese Office Action dated Dec. 14, 2016 for Taiwanese Patent Application No. 104138842, 9 pages.

*Primary Examiner* — William B Perkey
(74) *Attorney, Agent, or Firm* — Jackson IPG PLLC; Demian K. Jackson (57) ABSTRACT

An image scanning system for tissue slides comprises a microscope, an image capture element, a splitter module and a shading module, wherein the microscope is used for carrying a plurality of tissue slides. The light pass through each of the tissue slides is able to enter the splitter module selectively by the shading module, and the light is guided into the image capture element via a plurality of splitters of the splitter module to make each of the tissue slides be imaged on the image capture element respectively for image scanning.

20 Claims, 5 Drawing Sheets

(56) References Cited

U.S. PATENT DOCUMENTS

| | | | |
|---|---|---|---|
| 2008/0259446 | A1 | 10/2008 | Komatsu et al. |
| 2011/0009163 | A1* | 1/2011 | Fletcher ............. G02B 21/0008 455/556.1 |
| 2012/0099852 | A1* | 4/2012 | Staker ................. G02B 21/365 396/432 |
| 2017/0146785 | A1* | 5/2017 | Hsieh ..................... G02B 26/02 |

FOREIGN PATENT DOCUMENTS

| | | |
|---|---|---|
| CN | 201820032 | 5/2011 |
| CN | 102109672 | 6/2011 |
| CN | 102375227 | 3/2012 |
| CN | 103140789 | 6/2013 |
| TW | 200931060 | 7/2009 |
| TW | 201123029 | 7/2011 |

\* cited by examiner

IMAGE SCANNING SYSTEM FOR TISSUE SLIDES

FIELD OF THE INVENTION

This invention relates to an image scanning system for tissue slides, and particularly relates to an image scanning system which enables to load a plurality of tissue slides simultaneously and selectively block light for imaging the tissue slides separately.

BACKGROUND OF THE INVENTION

Researcher usually loads single tissue slide into microscope stage, adjusts objective visual field and focal length for image scanning when he/she intends to scan the single tissue slide. If the single tissue slide has multiple regions require to be scanned separately, the researcher needs to adjust the objective visual field for capturing the different region image respectively, and he/she needs to adjust objective visual field and focal length again when another tissue slide is loaded. Therefore, improve scanning speed is difficult because the researcher has to adjust objective visual field and focal length again and again.

SUMMARY

The primary object of the present invention is to provide an image scanning system for tissue slides which enables load multiple tissue slides simultaneously and make each of the tissue slides being imaged on an image capture element respectively by a splitter module and a shading module, for scanning the tissue slides respectively.

An image scanning system for tissue slides of the present invention comprises a microscope, an image capture element, a splitter module and a shading module. The microscope includes a light source, a stage and a plurality of objective lenses, wherein the light source provides light, the stage is located between the light source and the objective lenses and used for carrying a plurality of tissue slides which have a scanning region respectively, and wherein each of the tissue slides corresponds to one of the objective lenses. The image capture element is configured on the microscope, wherein the scanning region of each of the tissue slides is imaged on the image capture element respectively, and the image capture element is used for capturing an image of each of the scanning regions. The splitter module is located between the objective lenses and the image capture element, and the light into the splitter module via each of the objective lenses, wherein the splitter module includes a plurality of first splitters, each of the first splitters corresponds to one of the objective lenses, and each of the first splitters is used for guiding the light into the image capture element. The shading module includes a plurality of covers which are located between the objective lenses and the splitter module, wherein each of the covers is able to selectively block the light into the splitter module via each of the objective lenses to make the light into the splitter module via one of the objective lenses.

The present invention enables selectively block the light into the splitter module by controlling each of the covers, so the light which pass through one of the tissue slides enables enter the splitter module via one of the objective lens, and the light is guided into the image capture element by each of the first splitters of the splitter module for capturing the image of one of the tissue slides. The tissue slides are able to be loaded simultaneously and imaged on the image capture element respectively by switching the covers, and image scanning efficiency of the tissue slides is able to be improved by reducing the time required to load the tissue slides, switch the objective lens or adjust objective visual field.

DETAILED DESCRIPTION OF THE INVENTION

Figure 1:
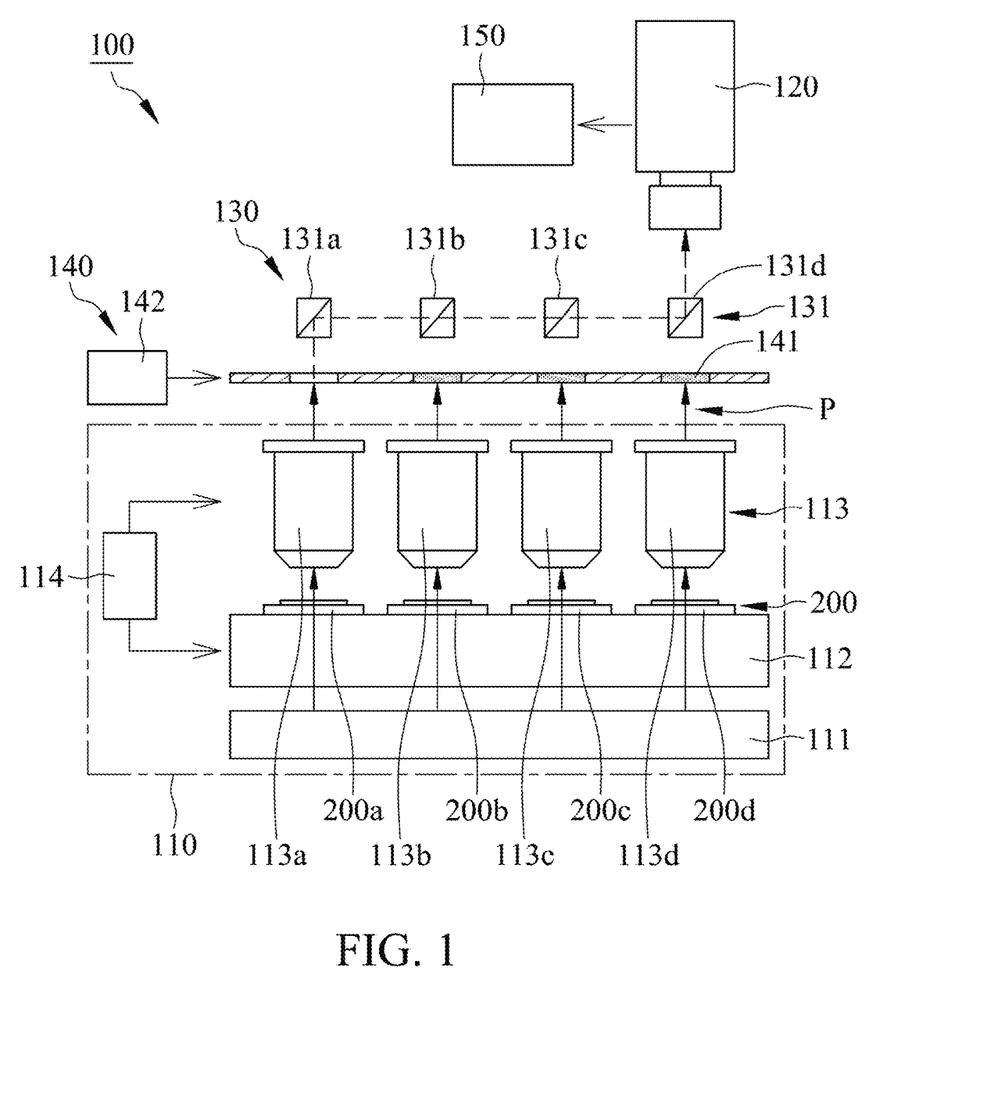
FIG. 1 is a schematic diagram illustrating an image scanning system for tissue slides in accordance with a first embodiment of the present invention.
Figure 2:
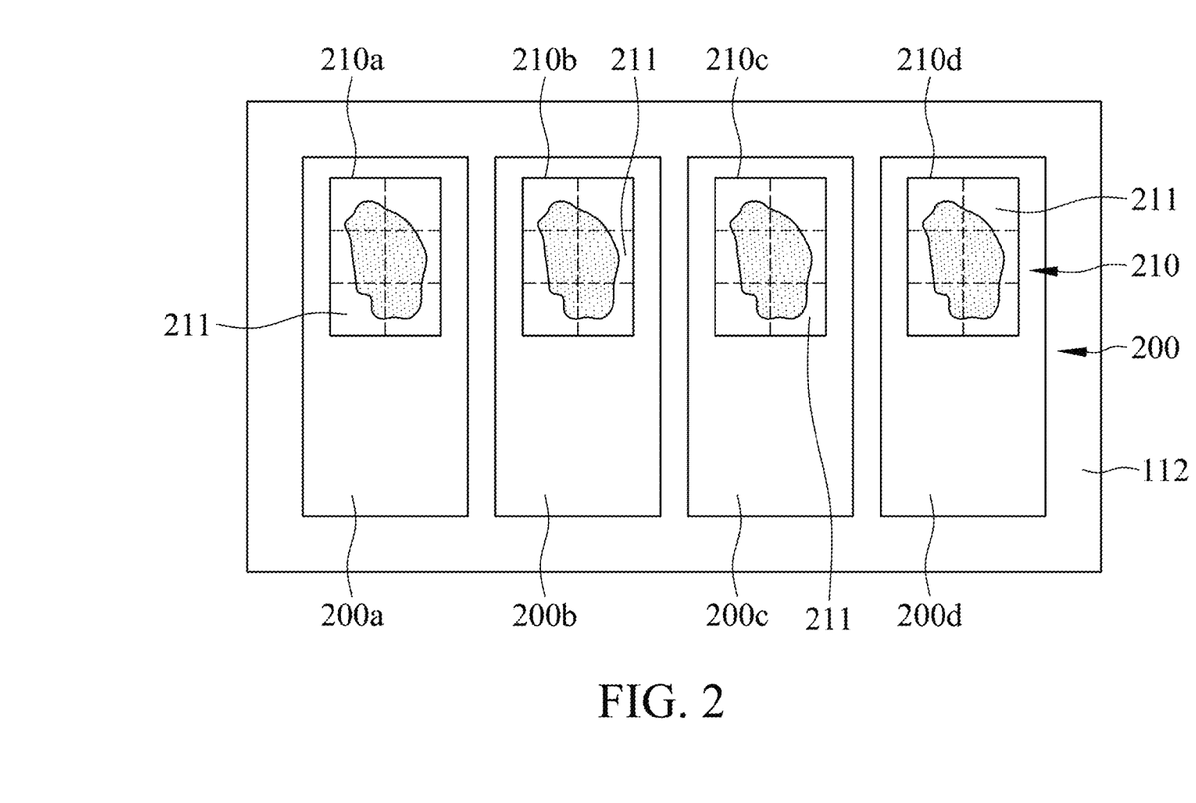
FIG. 2 is a schematic diagram illustrating tissue slides in accordance with the first embodiment of the present invention.

With reference to FIG. 1, an image scanning system for tissue slides 100 in accordance with a first embodiment of the present invention comprises a microscope 110 which includes a light source 111, a stage 112 and a plurality of objective lenses 113, wherein the light source 111 provides a light which is visible light, fluorescence or laser, the stage 112 is located between the light source 111 and the objective lenses 113 and used for carrying a plurality of tissue slides 200, and wherein each of the tissue slides 200 corresponds to one of the objective lenses 113 respectively. With reference to FIG. 2, each of the tissue slides 200 has a scanning region 210, wherein user can define the scanning region 210 voluntary or define the cover glass region as the scanning region 210 after previewing the tissue slides 200. In this embodiment, the cover glass region is defined as the scanning region 210.

With reference to FIG. 1, the microscope 110 further includes an adjusting element 114 which is used for adjusting the stage 112 displacement in x-axis direction and y-axis direction for moving the scanning region 210 of each of the tissue slides 200 into the visual field of the corresponding objective lens 113. In addition, the adjusting element 114 is also used for adjusting the objective lenses 113 displacement in z-axis direction for adjusting the focal length of the microscope 110. Preferably, the adjusting element 114 is a linear actuator.

With reference to FIG. 1, the image scanning system for tissue slides 100 further comprises an image capture element 120 which is configured on the microscope 110, and the image capture element 120 is a CCD camera in this embodiment. The image capture element 120 is used for capturing images of each of the scanning regions 210 when the scanning region 210 of each of the tissue slides 200 is imaged on the image capture element 120.

With reference to FIG. 1, the image scanning system for tissue slides 100 further comprises a splitter module 130 which is located between the objective lenses 113 and the image capture element 120. The light provided from the light source 111 enables respectively pass through each of the tissue slides 200 and each of the objective lenses 113 to into the splitter module 130. The splitter module 130 comprises a plurality of first splitters 131, wherein each of the splitters 131 corresponds to one of the objective lenses 113, and the first splitters 131 and the objective lenses 113 make a plurality of light paths P. Each of the first splitters 131 is used for guiding the light into the image capture element 120 to make the scanning region 210 of each of the tissue slides 200 imaged on the image capture element 120 respectively.

With reference to FIG. 1, the image scanning system for tissue slides 100 further comprises a shading module 140 which comprises a plurality of covers 141 and a control element 142. Each of the covers 141 is located between each of the objective lenses 113 and the splitter module 130, and the control element 142 is used for controlling each of the covers 141 to selectively block the light into the splitter module 130 via each of the objective lenses 113, so the light can enter the splitter module 130 via one of the objective lenses 113 and pass one of the light path P. In this embodiment, the covers 141 are selected from opaque covers and electrochromic covers.

When the covers 141 are opaque covers, the control element 142 controls the position of each of the covers 141 to make one of the covers 141 keep away from one of the light paths P and make the other covers 141 be located on the other light paths P for blocking the light into the splitter module 130. Only the scanning region 210 of one of the tissue slides 200 can be imaged on the image capture element 120 at a time because only the light pass through one of the tissue slides 200 enables into the splitter module 130. User can control the position of each of the covers 141 by the control element 142 to make the scanning regions 210 of the tissue slides 200 be imaged on the image capture element 120 respectively and sequentially.

When the covers 141 are electrochromic covers, the control element 142 can adjust color and transmittance of each of the covers 141 to make the light which pass through one of the tissue slides 200 enter the splitter module 130, and the light which pass through the other tissue slides 200 is blocked by the other covers 141 and can not into the splitter module 130. The electrochromic covers also can adjust luminous flux of the light into the splitter module 130, so user can adjust the color and transmittance of the electrochromic covers according to required luminous flux of each of the tissue slides 200. Preferably, the control element 142 is microprocessor.

With reference to FIGS. 1 and 2, in this embodiment, the microscope 110 includes four objective lenses 113*a*, 113*b*, 113*c* and 113*d*, and the stage 112 enables carry four tissue slides 200*a*, 200*b*, 200*c* and 200*d* which have the corresponding scanning regions 210*a*, 210*b*, 210*c* and 210*d* respectively. Each of the objective lenses 113*a*, 113*b*, 113*c* and 113*d* is corresponding to each of the tissue slides 200*a*, 200*b*, 200*c* and 200*d* respectively, so the light pass through the tissue slide 200*a* will into the splitter module 130 via the objective lens 113*a*, the light pass through the tissue slide 200*b* will into the splitter module 130 via the objective lens 113*b*, the light pass through the tissue slide 200*c* will into the splitter module 130 via the objective lens 113*c*, and the light pass through the tissue slide 200*d* will into the splitter module 130 via the objective lens 113*d*.

With reference to FIG. 1, in this embodiment, the splitter module 130 includes four first splitters 131*a*, 131*b*, 131*c* and 131*d* which are corresponding to the objective lenses 113*a*, 113*b*, 113*c* and 113*d* respectively, and the image capture element 120 is configured above the first splitter 131*d*. When user controls each of the covers 141 by the control element 142 of the shading module 140 to make the light into the splitter module 130 via the objective lens 113*a* only, the light is guided into the image capture element 120 by the first splitters 131*a*, 131*b*, 131*c* and 131*d* sequentially, and the scanning region 210*a* of the tissue slide 200*a* can be imaged on the image capture element 120.

Figure 3:
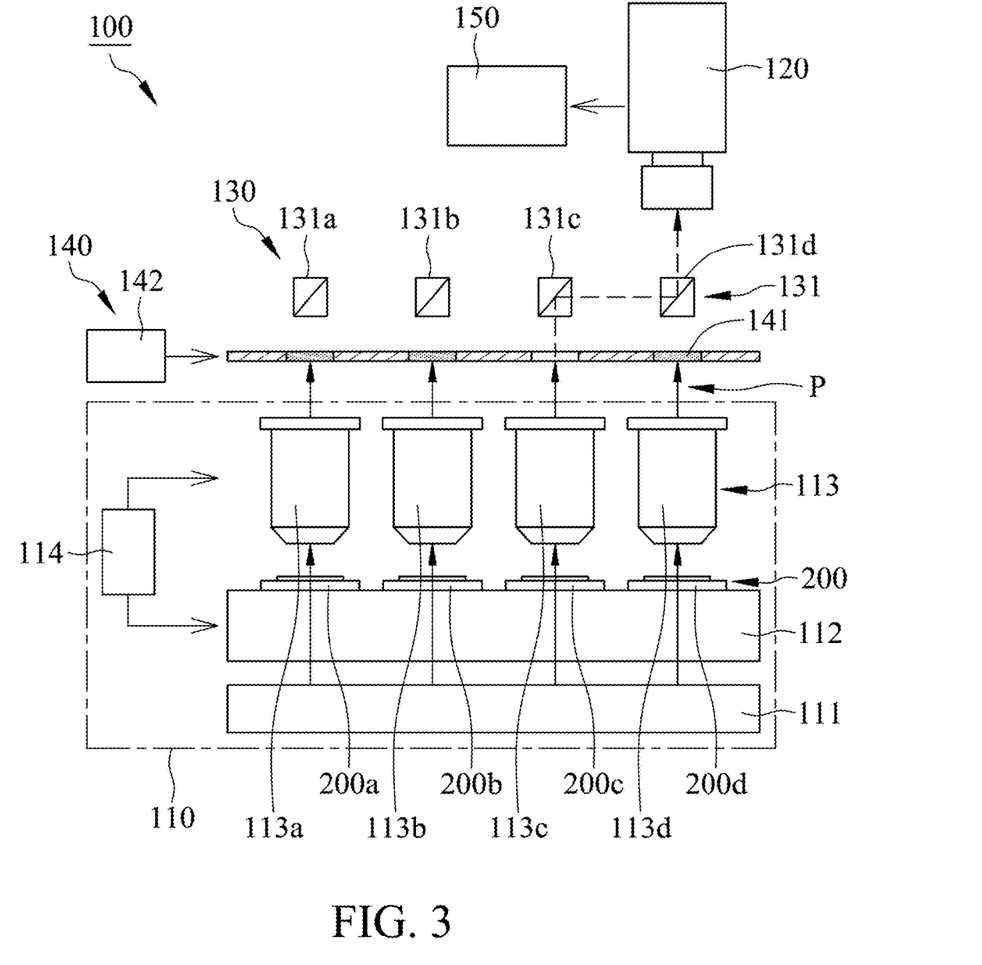
FIG. 3 is a schematic diagram illustrating the image scanning system for tissue slides in accordance with the first embodiment of the present invention.

With reference to FIG. 3, when user switches the covers 141 by the control element 142 to make the light into the splitter module 130 via the objective lens 113*c* only, the light is guided into the image capture element 120 by the first splitters 131*c* and 131*d* sequentially, and the scanning region 210*c* of the tissue slide 200*c* can be imaged on the image capture element 120.

With reference to FIGS. 1 and 2, the scanning region 210 of each of the tissue slides 200 contains a plurality of partial regions 211, and user can use the adjusting element 114 of the microscope 110 to adjust the position of the stage 112 for moving each of the partial regions 211 at the same position of each of the scanning regions 210 into visual field of each of the objective lenses 113. And user also can use the control element 142 of the shading module 140 to control each of the covers 141 to make each of the partial regions 211 at the same position of each of the scanning regions 210 be imaged on the image capture element 120 respectively, and the image capture element 120 can capture a partial image of each of the partial regions 211 respectively.

With reference to FIG. 1, the image scanning system for tissue slides 100 further comprises an image processing element 150 which is electrically connected with the image capture element 120, wherein the image processing element 150 is used for storing the images captured by the image capture element 120 and classifying the partial images of each of the tissue slides 200. In addition, the image processing element 150 enables stitch the partial images of the same scanning region 210 together to form a panoramic image and output the panoramic image into a digital image.

Figure 4:
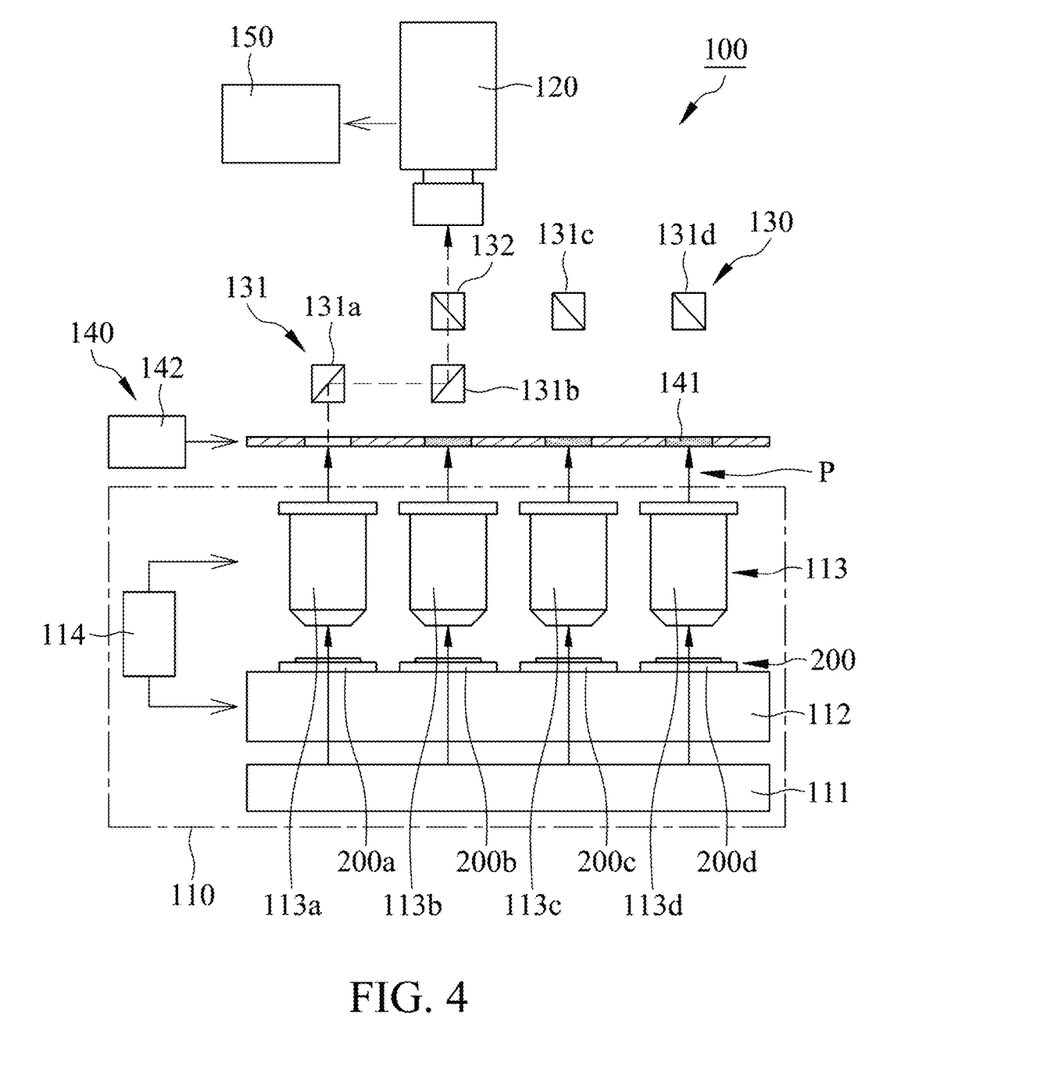
FIG. 4 is a schematic diagram illustrating an image scanning system for tissue slides in accordance with a second embodiment of the present invention.
Figure 5:
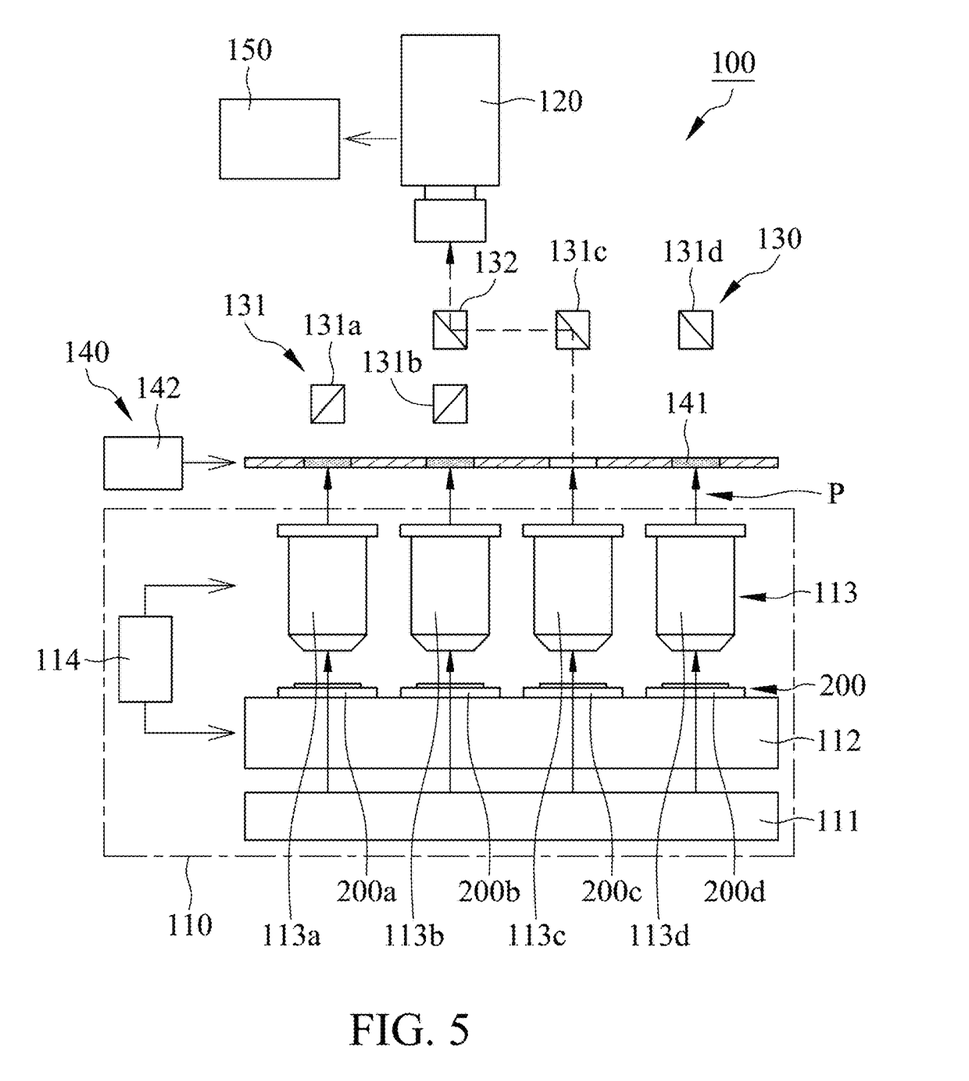
FIG. 5 is a schematic diagram illustrating the image scanning system for tissue slides in accordance with the second embodiment of the present invention.

A second embodiment of the present invention is illustrated in FIGS. 4 and 5, and the difference between the first and second embodiment is that the splitter module 130 further includes a second splitter 132 which is located between the first splitters 131 and the image capture element 120. The image capture element 120 is configured above the second splitter 132, and the second splitter 132 is used for guiding the light into the image capture element 120 via the first splitters 131.

With reference to FIG. 4, when the control element 142 of the shading module 140 is used for controlling the covers 141 to make the light into the splitter module 130 via the objective lens 113*a* only, the light is guided into the image capture element 120 by the first splitters 131*a*, 131*b* and the second splitter 132 sequentially, and the scanning region 210*a* of the tissue slide 200*a* can be imaged on the image capture element 120.

With reference to FIG. 5, the light is guided into the image capture element 120 by the first splitter 131*c* and the second splitter 132 sequentially when the light into the splitter module 130 via the objective lens 113*c* only, so the scanning region 210*c* of the tissue slide 200*c* can be imaged on the image capture element 120.

The present invention controls the light into the splitter module 130 via only one of the objective lenses 113 at a time by the shading module 140, so there is no overlay image. And the light from different paths enables into the image capture element 120 by the guidance of the splitter module 130, therefore the present invention can capture the images of multiple tissue slides by only one image capture element.

While this invention has been particularly illustrated and described in detail with respect to the preferred embodiments thereof, it will be clearly understood by those skilled in the art that is not limited to the specific features shown and described and various modified and changed in form and details may be made without separation from the spirit and scope of this invention.

What is claimed is:

1. An image scanning system for tissue slides comprising:
   a microscope including a light source, a stage and a plurality of objective lenses, wherein the light source provides light, the stage is located between the light source and the objective lenses and used for carrying a plurality of tissue slides which have a scanning region respectively, and wherein each of the tissue slides corresponds to one of the objective lenses;
   an image capture element configured on the microscope, wherein the scanning region of each of the tissue slides is imaged on the image capture element respectively, and the image capture element is used for capturing an image of each of the scanning regions;
   a splitter module located between the objective lenses and the image capture element, the light into the splitter module via each of the objective lenses, wherein the splitter module includes a plurality of first splitters, each of the first splitters corresponds to one of the objective lenses, and each of the first splitters is used for guiding the light into the image capture element; and
   a shading module including a plurality of covers which are located between the objective lenses and the splitter module, wherein each of the covers is able to selectively block the light into the splitter module via each of the objective lenses to make the light into the splitter module via one of the objective lenses.

2. The image scanning system for tissue slides in accordance with claim 1, wherein the shading module further includes a control element which is used for controlling each of the covers to block the light selectively.

3. The image scanning system for tissue slides in accordance with claim 2, wherein the covers are electrochromic covers.

4. The image scanning system for tissue slides in accordance with claim 1, wherein the splitter module further includes a second splitter located between the first splitters and the image capture element, the second splitter is used for guiding the light into the image capture element from each of the first splitters.

5. The image scanning system for tissue slides in accordance with claim 1, wherein the scanning region of each of the tissue slides contains a plurality of partial images, each of the partial images is imaged on the image capture element respectively, and the image capture element captures a partial image of each of the partial regions respectively.

6. The image scanning system for tissue slides in accordance with claim 5 further comprises an image processing element electrically connected with the image capture element, wherein the image processing element is used for classifying the partial images.

7. The image scanning system for tissue slides in accordance with claim 6, wherein the image processing element stitches the partial images of the same scanning region together to form a panoramic image.

8. The image scanning system for tissue slides in accordance with claim 7, wherein the image processing element outputs the panoramic image of the scanning region into a digital image.

9. The image scanning system for tissue slides in accordance with claim 1, wherein the microscope further includes a adjusting element which is used for adjusting the stage displacement in x-axis direction and y-axis direction.

10. The image scanning system for tissue slides in accordance with claim 9, wherein the adjusting element is further used for adjusting the objective lenses displacement in z-axis direction.

11. An image scanning system for tissue slides comprising:
    a microscope including a stage and a plurality of objective lenses, wherein the stage is used for carrying a plurality of tissue slides which have a scanning region respectively, and each of the tissue slides corresponds to one of the objective lenses;
    an image capture element configured on the microscope, wherein the scanning region of each of the tissue slides is imaged on the image capture element respectively, and the image capture element is used for capturing an image of each of the scanning regions;
    a splitter module located between the objective lenses and the image capture element, wherein the splitter module includes a plurality of first splitters, and each of the first splitters corresponds to one of the objective lenses, wherein the first splitters and the objective lenses form a plurality of light paths; and
    a shading module including a plurality of covers which are located between the objective lenses and the splitter module, wherein each of the covers is able to selectively block a light to make the light pass through one of the light paths.

12. The image scanning system for tissue slides in accordance with claim 11, wherein the shading module further includes a control element which is used for controlling each of the covers to block the light selectively.

13. The image scanning system for tissue slides in accordance with claim 12, wherein the covers are electrochromic covers.

14. The image scanning system for tissue slides in accordance with claim 11, wherein the splitter module further includes a second splitter located between the first splitters and the image capture element, the second splitter is used for guiding the light into the image capture element from each of the first splitters.

15. The image scanning system for tissue slides in accordance with claim 11, wherein the scanning region of each of the tissue slides contains a plurality of partial images, each of the partial images is imaged on the image capture element respectively, and the image capture element captures a partial image of each of the partial regions respectively.

16. The image scanning system for tissue slides in accordance with claim 15 further comprises an image processing element electrically connected with the image capture element, wherein the image processing element is used for classifying the partial images.

17. The image scanning system for tissue slides in accordance with claim 16, wherein the image processing element stitches the partial images of the same scanning region together to form a panoramic image.

18. The image scanning system for tissue slides in accordance with claim 17, wherein the image processing element outputs the panoramic image of the scanning region into a digital image.

19. The image scanning system for tissue slides in accordance with claim 11, wherein the microscope further includes a adjusting element which is used for adjusting the stage displacement in x-axis direction and y-axis direction.

20. The image scanning system for tissue slides in accordance with claim 19, wherein the adjusting element is further used for adjusting each of the objective lenses displacement in z-axis direction.

* * * * *